United States Patent
Tseng

(10) Patent No.: US 7,284,893 B2
(45) Date of Patent: Oct. 23, 2007

(54) LIGHT EQUALIZING STRUCTURE OF BACKLIGHT MODULES

(75) Inventor: Wen-Pao Tseng, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 0 days.

(21) Appl. No.: 11/074,649

(22) Filed: Mar. 9, 2005

(65) Prior Publication Data
US 2006/0203467 A1    Sep. 14, 2006

(51) Int. Cl.
*F21V 7/04* (2006.01)
(52) U.S. Cl. .................................... 362/625
(58) Field of Classification Search ................ 362/609, 362/623, 625, 626, 628, 30
See application file for complete search history.

(56) References Cited

U.S. PATENT DOCUMENTS 5,584,556 A * 12/1996 Yokoyama et al. ......... 362/625
5,779,338 A * 7/1998 Ishikawa et al. ............ 362/625
6,068,382 A * 5/2000 Fukui et al. ................ 362/625
6,074,069 A * 6/2000 Chao-Ching et al. ......... 362/26
6,305,813 B1 * 10/2001 Lekson et al. ............... 362/625
7,040,796 B2 * 5/2006 Sugiura et al. .............. 362/608

* cited by examiner

*Primary Examiner*—Alan Cariaso
*Assistant Examiner*—Leah S. Lovell
(74) *Attorney, Agent, or Firm*—Troxell Law Office, PLLC

(57) ABSTRACT

A light equalizing structure installs a plurality of reflective sections on a reflective panel of a backlight module for reflecting the light emitted by a light source towards a panel assembly, and each reflective section keeps a predetermined distance from the light source. The height of each reflective section is directly proportional to the distance from its light source. In other words, there is a predetermined height difference for every two adjacent reflective sections, so that the light emitted from different angles of the light source can be reflected evenly from each reflective section on the reflective panel towards the panel assembly to achieve the effect of providing even brightness for each section of the panel assembly.

2 Claims, 3 Drawing Sheets

LIGHT EQUALIZING STRUCTURE OF BACKLIGHT MODULES

BACKGROUND OF THE INVENTION

1. Field of the Invention

The present invention generally relates to a light reflection technology for backlight modules, and more specifically to an improved light equalizing structure of a reflective panel of a backlight module capable of producing an even brightness for each section of the panel assembly of the backlight module.

2. Description of the Related Art

Referring to FIG. 1, a cross-sectional view of a backlight module structure used for liquid crystal displays is shown. The backlight module structure comprises at least one light source 20' disposed on a side of a panel assembly 10', and a reflective hood 30' sheltering an external side of the light source 20'. With such reflective hood 30', the light of the light source 20' is reflected towards the internal side of the panel assembly 10'. In particular, a reflective panel 40' is installed at the bottom of another panel assembly 10' of the whole backlight module for reflecting light emitted from each light source 20' towards the panel assembly 10' by means of the function of the reflective panel 40' so as to achieve a proper brightness performance of the overall backlight module.

However, the reflective panel 40' of a conventional backlight module is a flat panel structure, and the light emergent angles of the light sources 20' are different. Therefore, it is difficult to anticipate that the light emitted from the light sources can be reflected evenly towards every section of the panel assembly 10'. The brightness of the panel assembly 10' is centralized at a specific section and produces the so-called bright lines, which will greatly affect the overall brightness performance of the backlight module.

SUMMARY OF THE INVENTION

It is a primary objective of the present invention to provide a light equalizing structure of backlight modules, which installs a plurality of reflective sections on a reflective panel of a backlight module for reflecting the light emitted by a light source towards a panel assembly, and each reflective section keeps a predetermined distance from the light source. The height of each reflective section is directly proportional to the distance of the reflective section from its light source. In other words, there is a specific height difference between every two adjacent reflective sections, so that the light emitted from different angles of the light source can be reflected evenly from each reflective section on the reflective panel towards the panel assembly to achieve the effect of producing even brightness for each section of the panel assembly.

DETAILED DESCRIPTION OF THE PREFERRED EMBODIMENTS

Figure 1:
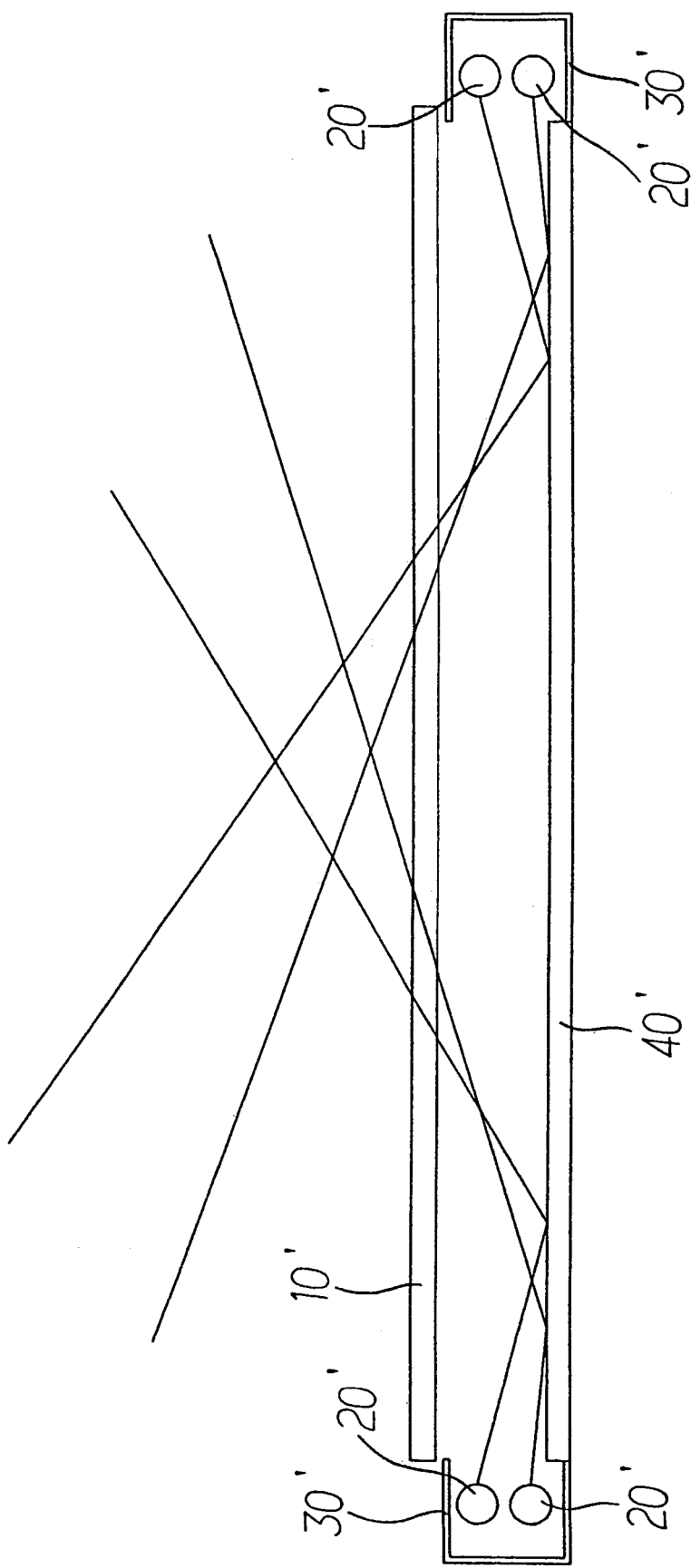
FIG. 1 is a cross-sectional view of a conventional backlight module.
Figure 2:
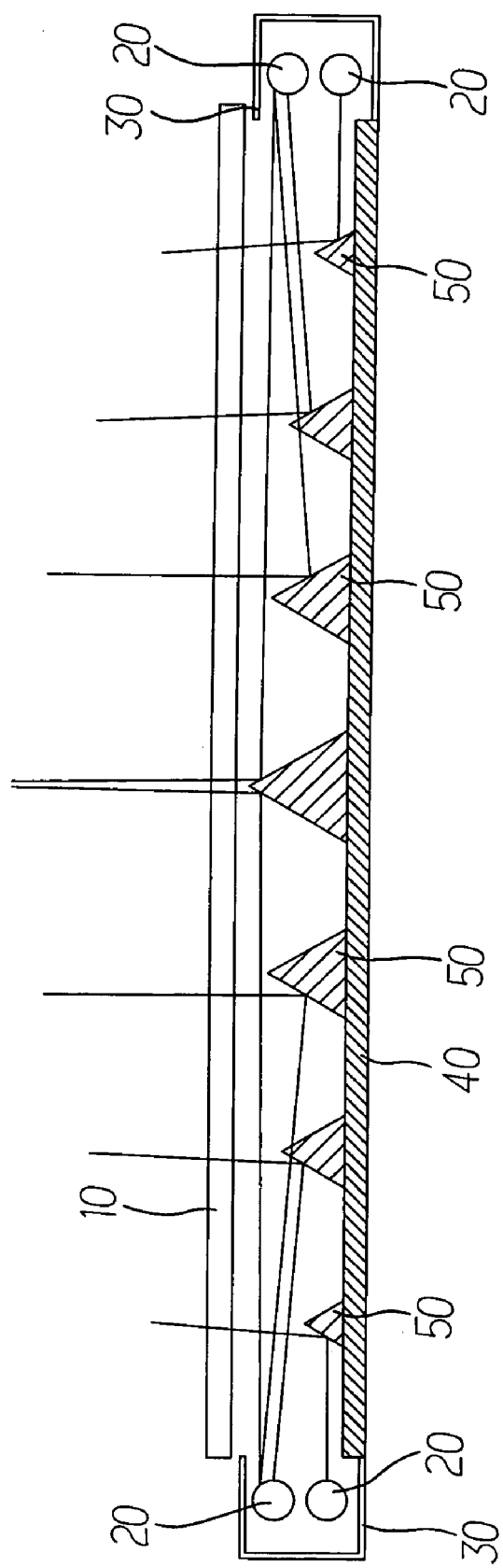
FIG. 2 is a cross-sectional view of a backlight module according to a first preferred embodiment of the present invention.
Figure 3:
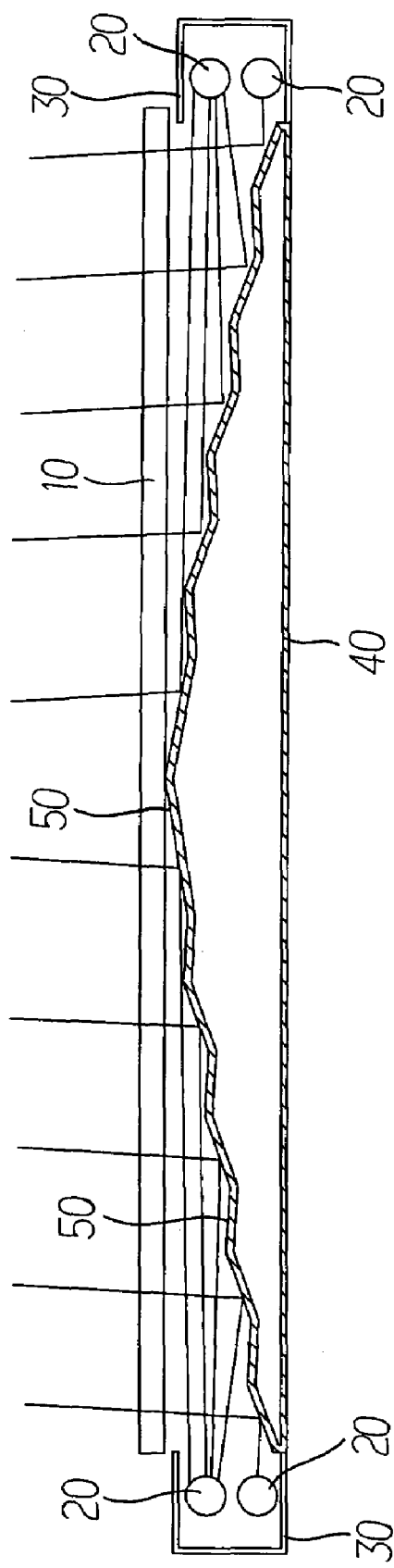
FIG. 3 is a cross-sectional view of a backlight module according to a second preferred embodiment of the present invention.

Referring to FIG. 2, a light equalizing structure of the present invention is illustrated. The assembly of the light equalizing structure as shown in FIG. 2 comprises a plurality of reflective sections 50 on a reflective panel 40 of a backlight module for reflecting the light emitted by a light source 20 towards a panel assembly 10, and each reflective section 50 keeps a predetermined distance from the light source 20. The height of each reflective section 50 is directly proportional to the distance from its light source 20. In other words, there is a specific height difference between every two adjacent reflective sections 50.

In actual practices, the whole backlight module comprises at least one light source 20 disposed on a side of a panel assembly 10 and a reflective hood sheltering an external side of the light source 20. With such reflective hood 30, the light of the light source 20 is reflected towards the internal side of the panel assembly 10. A reflective panel 40 is installed at the bottom of another panel assembly 10 of the whole backlight module for reflecting the light emitted from each light source 20 towards the panel assembly 30 by means of the action of the reflective panel 40, so as to achieve a proper brightness performance of the overall backlight module. Particularly, when the reflective hood 30 projects the light emitted by the light source 20 towards the internal side of the panel assembly 10, the emergent light of the light source 20 with different emergent angles is projected evenly towards the panel assembly 10 through different reflective sections 50 of the reflective panel 40, so as to provide even brightness for each section of the panel assembly 10.

In a light equalizing structure according to a preferred embodiment of the present invention, each reflective section 50 is a single structure fixed onto the reflective panel 40 as shown in FIG. 2; of course, each reflective section of the reflective panel 40 can be a structure that integrates with each reflective section 50 as a whole, and the reflective panel 40 and each reflective section 50 constitute a hollow, such that the light of the light source emitted from different angles is projected towards the panel assembly 10, and can provide even brightness for each section of the panel assembly 10 as described above.

In summation of the above description, the present invention herein provides a feasible light equalizing device of a backlight module and complies with the patent application requirements. However, the description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light equalizing structure of backlight modules comprising:
   a) a panel assembly located on a top of the module;
   b) at least one light source;
   c) a reflective panel located on a bottom of the module; and
   d) a plurality of reflective sections spaced apart and protruding upwardly from a top surface of the reflective panel, the plurality of reflective sections reflecting a light emitted from the light source toward the panel assembly, wherein each corresponding reflective section of the plurality of reflective sections has a height directly proportional to a distance between the at least one light source and the corresponding reflective section, wherein the plurality of reflective sections are integrally formed with the reflective panel to form a hollow interior encircled by the plurality of reflective sections and the reflective panel.

2. The light equalizing structure according to claim 1, further comprising a reflective hood covering an external side of each of the at least one light source, the plurality of reflective sections are located between the panel assembly and the reflective panel, the at least one light source includes at least one first light source located at a first end and at least one second light source located at a second end.

* * * * *